United States Patent [19]

Osada et al.

[11] 4,372,365
[45] Feb. 8, 1983

[54] SAFETY WHEELS

[75] Inventors: Isao Osada, Izumi; Shoichi Sano, Tokorozawa, both of Japan

[73] Assignees: Ohtsu Tire and Rubber Co. Ltd.; Honda Giken Kogyo Kabushiki Kaisha, both of Japan

[21] Appl. No.: 168,342

[22] Filed: Jul. 11, 1980

Related U.S. Application Data

[63] Continuation of Ser. No. 9,584, Feb. 5, 1979, abandoned.

[30] Foreign Application Priority Data

Mar. 14, 1978 [JP] Japan .................................. 53-29438

[51] Int. Cl.³ .................... B60C 17/00; B60C 5/00; B60C 15/00
[52] U.S. Cl. ............................ 152/158; 152/330 RF; 152/330 L; 152/339; 152/362 R; 152/363; 152/401; 152/411
[58] Field of Search ............. 152/158, 330 RF, 330 L, 152/331, 333, 338, 339, 152, 155, 157, 362 R, 362 CS, 363, 389, 391, 393, 396, 401, 405, 407, 411

[56] References Cited

U.S. PATENT DOCUMENTS

| 2,045,341 | 6/1936 | Bourdon | 152/158 X |
| 3,981,341 | 9/1976 | Bauer et al. | 152/158 |
| 3,990,491 | 11/1976 | Hampshire et al. | 152/158 |
| 3,990,492 | 11/1976 | Hyndman et al. | 152/158 |
| 4,157,106 | 6/1979 | Cataldo | 152/158 |
| 4,163,466 | 8/1979 | Watts | 152/158 |

Primary Examiner—Edward C. Kimlin
Assistant Examiner—Thomas Bokan
Attorney, Agent, or Firm—Armstrong, Nikaido, Marmelstein & Kubovcik

[57] ABSTRACT

A safety wheel designed so that when air sealed within a tire is lost, the vehicle may be supported by a flat protector device in place of air pressure within the tire. The safety wheel comprises a split rim, a tubeless tire and a flat protector device which comprises a flat protector seat portion annularly fixed along the outer peripheral surface of the split rim, and a flat protector body formed of at least one pipe annularly fixed along the outer peripheral surface of the flat protector seat portion.

3 Claims, 10 Drawing Figures

SAFETY WHEELS

This is a continuation of application Ser. No. 9,584 now abandoned filed Feb. 5, 1979.

BACKGROUND OF THE INVENTION

1. Field of the Invention

The present invention relates to a safety wheel which is designed so that when air sealed within a tire is lost due to puncture of the tire or the like. The vehicle employing the invention may travel safely and easily, without hindrance to a repair shop or the like without replacement of the defective tire.

2. Description of the Prior Art

In general, it is extremely dangerous and actually difficult to replace a punctured tire on expressways, congested roads or the like when air is lost by reason of puncture of tire or for other reasons. Further, even on the roads on which the punctured tire may be replaced, such replacement of a tire is extremely troublesome.

Thus, even when sealed air within a tire is lost due to puncture of the tire or the like, if the vehicle can travel in that state safely and easily to the nearest repair shop or the like with a minimal damage to the tire, it is very convenient, because one need not to perform troublesome and time-consuming tire replacement.

In the past, various proposals have been made to provide for safety wheels in which a flat protector device, which is adapted to support the weight of the vehicle in place of air pressure within the tire when the latter is punctured, may be incorporated into the tire to secure the safe travel of the vehicle. In addition to the function peculiar to the flat protector device which can support the weight of the vehicle in place of air pressure within the tire, the flat protector devices of the prior art preferably possesses features which include: (a) the device is not light-weight so as to increase the weight of the vehicle as little as possible, (b) the prior devices failed to provide cushioning when the tire is supported so to damp the shock to the body of the vehicle, (c) the devices were not able to be easily incorporated and of less cost.

SUMMARY OF THE INVENTION

It is the main object of the present invention to overcome the prior art.

It is therefore a further object of the present invention to provide a safety wheel of simple construction reduced cost and to operate more efficiently than the prior art.

The invention will be more readily understood from the ensuing description of embodiments thereof in reference to the accompanying drawings.

DESCRIPTION OF THE INVENTION

Figure 1:
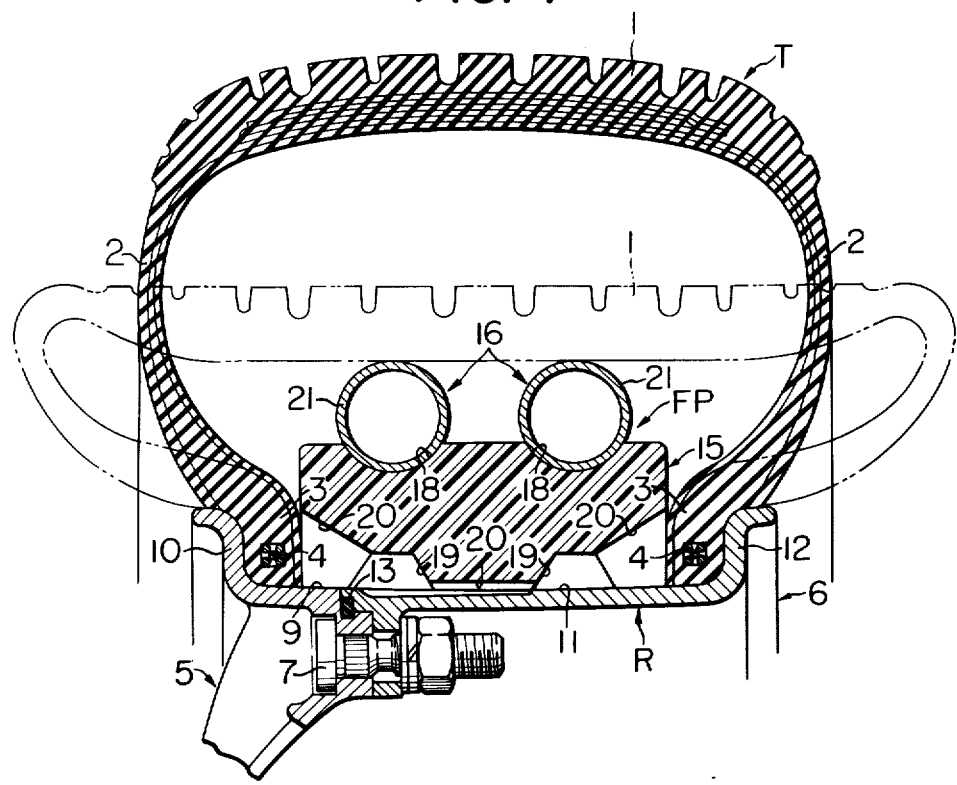
FIG. 1 is a partly longitudinal sectional view of a safety wheel in accordance with the present invention.

Referring now to the drawings, FIG. 1 is a partial longitudinal section showing a safety wheel in accordance with the present invention. This safety wheel comprises a tubeless tire T, a split rim R and a flat protector device FP.

The tire T has a well-known construction which is bisymmetrical, in which a tread portion 1 has side walls 2 integrally extended to left and right thereof, and bead portions 3, which gradually increase their wall thickness, and integrally extended from side wall portions 2. The bead portions 3 have bead wires 4, respectively, embedded therein.

Secondly, the split rim R is explained, which is constructed such that an outboard rim 5 is joined with an inboard rim 6. The outboard rim 5 and the inboard rim 6 being integrally connected by a plurality of connecting bolts 7. The outboard rim 5 has an outer end of a main body thereof provided with a narrow rim base 9, which outer end has a rim flange 10 integrally extended to hold the bead portion 3 of the tire T. Similarly, the inboard rim 6 has an outer end of a main body thereof provided with a wide rim base 11, which outer end has a rim flange 12 integrally extended to hold the bead portion 3 of the tire T. The rim bases 9 and 11 of the outboard and inboard rims 5 and 6, respectively, cooperate with each other to form a flat cylindrical supporting surface of the split rim R. An O-ring 13 is interposed between connecting surfaces, externally of the connecting bolts 7, of the outboard and inboard rims 5 and 6.

Figure 6:
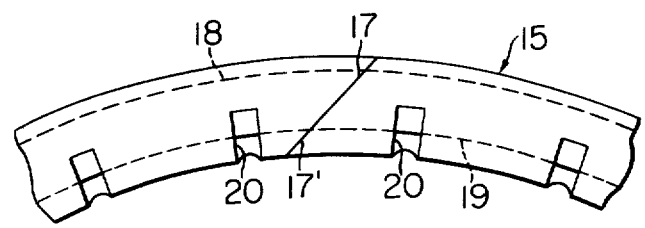
FIG. 6 is a side view of a joint of the flat protector seat portion.

Thirdly, the flat protector device FP will be explained. This flat protector device comprises a flat protector seat portion 15 and flat protector bodies 16. The flat protector seat portion is a web-like member substantially square in section formed of an elastic material such as foamed polyurethane or the like and is annularly wound with inclined ends 17, 17 cut into inclined surfaces opposite to each other as shown in FIG. 6 and is integrally joined to form an endless annular configuration. The flat protector seat portion 15 is incorporated into the tire T with dimensions set so that the inner peripheral surface thereof is smaller in diameter than the outer peripheral surface of the split rim R.

It will be noted that the flat protector seat portion 15 may also be constructed by joining a plurality of circular seat units in an endless annular pattern.

Figure 5:
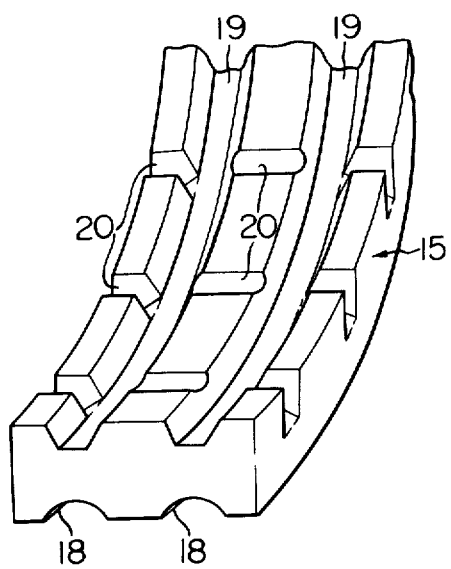
FIG. 5 is a partly perspective view of the flat protector seat portion.

As will be clearly shown in FIG. 5, the flat protector seat portion 15 is formed in the outer peripheral surface thereof with two peripheral grooves 18 of circular section to thereby locate in position flat protector bodies 16 which will be described later. The flat protector seat portion 15 is also formed in the inner peripheral surface thereof with a plurality of longitudinal grooves 19 and lateral grooves 20, the lateral grooves 20 having opposite ends open to opposite sides of the flat protector seat portion 15. Thus, even when the flat protector seat portion 15 is incorporated into the tire T with the opposite sides thereof pressed against the inner surface of the bead portion 3 of the tire T, pressure air fed under pressure into the tire T from an air valve (not shown) disposed on the split rim R is filled into the whole region within the tire T via the longitudinal grooves 19 and the lateral grooves 20.

Figure 7:
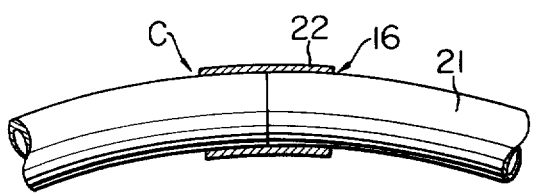
FIG. 7 is a sectional view of a connection of the flat protector body.
Figure 8:
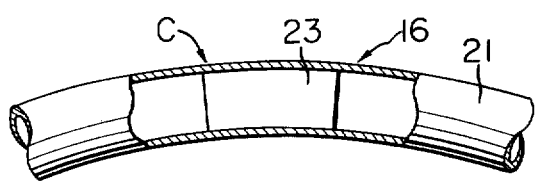
FIG. 8 is a sectional view showing a modified form of the connection of the flat protector body.

A pipe formed of an elastic material such as synthetic resin strengthened by fibers is wound in an endless annular pattern, both ends of which are integrally connected. In the illustrated embodiment, the flat protector body comprises two pipes 21. Both ends of each pipe 21 are connected by connecting means C in which a tubular outer connector 22 is slipped on the outer peripheral portions of both ends of the pipe 21, as shown in FIG. 7, and which are integrally connected by adhesives, screws or other fastening means. An inner connector 23 is fitted in the inner peripheral surfaces of both ends of the pipe 21, as shown in FIG. 8, which are integrally connected by adhesives, screws or other fastening means.

Figure 10:
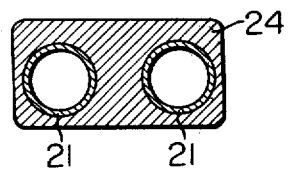
FIG. 10 is a sectional view taken on line X—X of FIG. 9.
Figure 9:
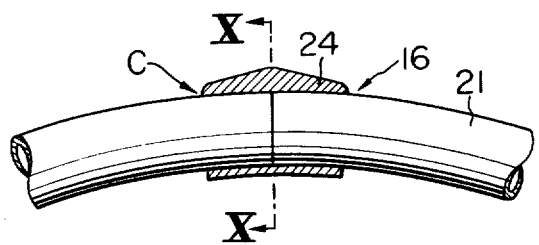
FIG. 9 is a sectional view showing a further modified form of the connection of the flat protector body.

Various means other than those noted above may be employed to connect both ends of the pipe 21. As is shown in FIGS. 9 and 10, a connector 24 can embrace two pipes 21, may be used to connect both ends of the pipes 21 and at the same time integrally connect two pipes 21.

Further, connecting means C used to connect both ends of the flat protector body 16, may comprise a connector 24 which has a thick wall particularly on the outer peripheral side of the body 16 whereby, the flat protector body 16 itself may be utilized as a member for sensing a puncture of a tire.

Figure 2:
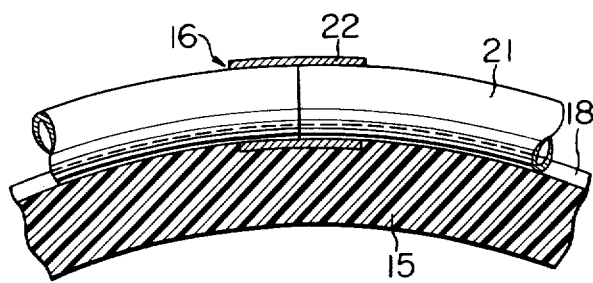
FIG. 2 is an enlarged side view of a locating portion of a flat protector seat portion and a body thereof.
Figure 4:
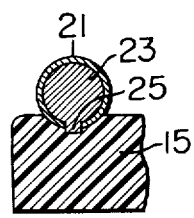
FIG. 4 is a sectional view taken on line IV—IV of FIG. 3.
Figure 3:
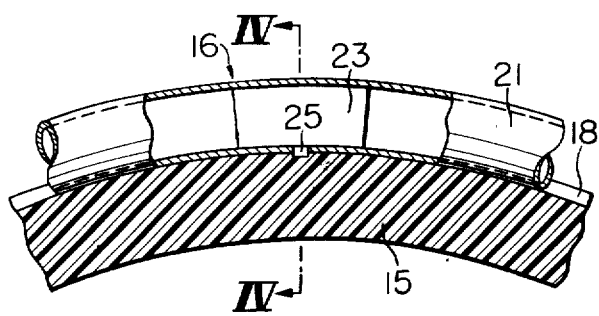
FIG. 3 is an enlarged side view of a locating example in modified form of the flat protector seat portion and the body thereof.

The thus constructed flat protector seat portion 15 and flat protector body 16 are relatively positioned by locating means. This positioning may be accomplished by use of the outer connector 22 or inner connector 23. That is, a part of the outer connector 22 is slipped on to the flat protector seat portion 15 as shown in FIG. 2, and the inner connector 23 is formed with a positioning projection 25, which extends outside the pipe 21 into the flat protector seat portion 15 to thereby peripherally position the flat protector seat portion 15 and the flat protector body 16. It will be noted that the flat protector seat portion 15 and the body 16 thereof may also be positioned by independent positioning means instead of the outer or inner connectors 22, 23.

The thus constructed flat protector body 16 and the seat portion 15 thereof may be incorporated into the tire T in the following manner. First, both ends of the respective two pipes 21 are displaced axially or laterally from each other while being unconnected, after which, one end thereof is rotated and inserted into the tire T. Upon completion of the insertion, both ends of two pipes 21 may be integrally connected by the connecting means C.

Next, the flat protector seat portion 15 may be inserted into the tire T, in which case, the seat portion 15 may be inserted into the tire T by reducing the diameter of the seat portion while the inclined ends 17 and 17' remain unbonded. In this case, the inclined ends 17 and 17' are inclined in a direction opposite to each other. Hence, the diameter thereof may be easily reduced to provide insertion thereof into the tire T without difficulty. After the seat portion has been inserted into the tire T, the inclined ends 17 and 17' are brought into abutment in registration to each other and then bonded. After the flat protector body 16 and the seat portion 15 thereof have been inserted into the tire T in a manner as described above, both members may be positioned in an inner peripheral direction by use of the outer connector 22 or inner connector 23.

As described above, when both the flat protector body 16 and the seat portion 15 are incorporated into the tire T and positioned therein, they cooperate with each other to increase the rigidity. Whereafter, when the split rim R composed of the outboard rim 5 and the inboard rim 6 are incorporated from the opposite sides of the tire T and connected by a plurality of connecting bolts 7, the flat cylindrical supporting surface composed of the rim bases 9 and 11 is fitted to the inner peripheral surface of the flat protector seat portion 15. The bead portions 3 of the tire T are firmly held by both sides of the seat portion 15 and the rim flanges 10, 12 of the split rim R to maintain a portion between the tire T and the split rim R in an airtight manner. Further, when the flat protector seat portion 15 is fitted to the rim bases 9 and 11 and assembled in position, as previously mentioned, two pipes 21 constituting the flat protector body 16 are closely received into the peripheral grooves 18 in the outer peripheral surface of the seat portion and positioned in an axial direction of the wheels.

BEST MODE OF THE INVENTION

A safety wheel comprising at least a split rim which can be divided into at least two portions in an axial direction of the wheel, a tubeless tire mounted on said split rim, and a flat protector device incorporated into an air chamber surrounded by said tubeless tire and said split rim, to support said tubeless tire when sealed air within said tubeless tire is lost, said flat protector device comprising a flat protector seat portion annularly fixed along the outer peripheral surface of said split rim to hold both bead portions of the tubeless tire in cooperation with both rim flanges of said split rim, and a flat protector body composed of at least one pipe and annularly fixed along the outer peripheral surface of said flat protector seat portion.

In addition, even when air pressure is filled into the tire T after the flat protector device FP has been incorporated as described above, air pressure from the air valve (not shown) disposed on the split rim R as described above, may be easily introduced into the whole region within the tire T via the longitudinal grooves 19 and lateral grooves 20 disposed in the inner peripheral surface of the flat protector seat portion 15.

Moreover, a lubricant is sealed into an air chamber surrounded by the tire T and the split rim R, so that when the tread portion 1 of the tire T comes into contact with the top surface of the flat protector FP resulting from the puncture of the tire T or the like, it is possible to reduce the frictional force produced therebetween to prevent damage thereof and heat generation.

In the case where the air chamber of the tire T is filled with air of a predetermined pressure and the wheels are then in a normally inflated condition, the weight of the vehicle is supported by air pressure within the tire T as shown by the solid line of FIG. 1. On the other hand, in the case the air sealed within the tire T is lost due to the puncture of the tire T or the like, the tire T deflates and as a result, the tread portion 1 thereof becomes flattened as shown by the dash-dotted contour lines to bear on the upper surface of the flat protector device FP so that the flat protector device FP supports the weight of the vehicle in place of air pressure within the tire T.

In accordance with the present invention, when sealed air within the tire is lost due to the puncture of tire or the like, the flat protector device may support the flattened tread portion of the tire, positively support the load applied to the wheel in place of air pressure of the tread and permit safe travel of the vehicle to a position as desired. In addition, the flat protector device may be divided into the flat protector seat portion and the flat protector body, which are integrally connected after incorporation thereof into the tire. Hence, they may be incorporated into the tire more simply and easily than is achieved by prior art, and after incorporation, they increase the rigidity, for positively supporting the load applied to the wheels in place of air pressure. Particularly, the flat protector body is made of pipes so that it has a sufficient rigidity to perform its desired function and is extremely light-weighted to materially decrease the weight of the wheels. Further, the flat protector body made of pipes has its own cushioning property and therefore it is possible to reduce the shock transmitted to the vehicle body. The flat protector body and flat protector seat portion can be formed of a material of simple shape, thus materially reducing the cost of manufacture.

If the connector of thick wall is used as connecting means for the pipes which constitute the flat protector body, it is possible to quickly allow a vehicle driver to notice the abnormality when the vehicle is running in a flat condition.

Many modifications and variations of the present invention are possible in light of the above teachings. It is, therefore, to be understood that within the scope of the appended claims, the invention may be practiced otherwise than as particularly described.

What is claimed is:

1. An improved safety wheel apparatus employing a split rim formed of at least two portions in an axial direction of the rim including two rim flanges and rim bases; a tubeless tire having bead portions and a ground-engaging tread portion being mounted on said rim, and a flat protector device incorporated into an air chamber surrounded by said tubeless tire and said split rim, said protector device serving to support said tubeless tire when air sealed within said tubeless tire is lost, the improvement wherein: said flat protector device comprises a flat protector seat portion annularly fitted at its radially inner surface along the outer peripheral surface of said split rim to hold said bead portions of said tubeless tire in cooperation with both rim flanges of said split rim, said flat protector seat portion being formed at its radially outer surface with at least two axially spaced apart annular grooves, said seat portion being defined by a web member formed of elastic material having joined end portions formed into an annular configuration, and at least two annular pipes of circular cross section formed independently of each other and free from mutual interaction, said pipes being annularly mounted in and held against axial movement by said annular grooves, spaced apart from the tread portion of said tire during the normal operation of said tire while being placed into supporting engagement with said tire tread portion, and free from engagement with the remaining portion of the tire during a puncture of said tire, each of said pipes having a pair of ends connected with each other by connector means, said connector means being engaged in an outer periphery of said seat portion, whereby said flat protector seat portion cooperates with said both rim flanges to strongly clamp the tire bead portions therebetween while said pipes act to support reactions transmitted from the road surface to the tire tread portion, said reactions being further transmitted from said tire tread portion to said rim bases through said flat protector seat portion so that said tire tread portion is supported by flat protector when air sealed within the tire is lost.

2. A safety wheel apparatus as claimed in claim 1 wherein: said flat protector seat portion has an inner peripheral surface smaller in diameter than an outer peripheral surface of said split rim.

3. A safety wheel apparatus as claimed in claim 1, wherein: said flat protector seat portion is formed of a plurality of circular seat members in an endless annular pattern.

* * * * *